United States Patent [19]

Ichihara et al.

[11] 3,787,333

[45] Jan. 22, 1974

[54] METHOD FOR THE PRODUCTION OF AN AUTOMOTIVE EXHAUST GAS CATALYST

[75] Inventors: Shoichi Ichihara, Ibaraki; Hauruichi Hara, Toyonaka; Takashi Ohara, Nishinomiya, all of Japan

[73] Assignee: Nippon Shokubai Kogyo Co., Ltd., Higashi-ku, Osaka, Japan

[22] Filed: Nov. 16, 1971

[21] Appl. No.: 199,378

[52] U.S. Cl. ............... 252/465, 252/466 B, 453/213
[51] Int. Cl. .......................... B01j 11/06, B01j 11/12
[58] Field of Search .......... 252/465, 466 B; 423/213

[56] References Cited
UNITED STATES PATENTS

| | | | |
|---|---|---|---|
| 3,133,029 | 5/1964 | Hoekstra | 425/213 X |
| 3,493,325 | 2/1970 | Roth | 252/465 X |
| 3,397,154 | 8/1968 | Talsma | 252/465 X |
| 3,437,426 | 4/1969 | Quesada | 252/466 B |
| 3,470,105 | 9/1969 | Briggs et al. | 252/465 X |

*Primary Examiner*—Daniel E. Wyman
*Assistant Examiner*—W. J. Shine
*Attorney, Agent, or Firm*—Leonard W. Sherman et al.

[57] ABSTRACT

A method for preparing a catalyst suitable for use in a catalytic system for oxidation of air pollutants in automotive exhaust gases, such method comprising, in combination, the steps of mixing and kneading a nickel source and a chromium source, and, as a binder, a member selected from the group consisting of an alumina sol and a soluble aluminum hydroxide, and, as a carrier, activated alumina, molding the resulting mixture with a catalyst molder into a desired shape, drying the formed material, impregnating the dried formed material with a solution of a palladium salt, drying the thus impregnated formed material, and thereafter calcining same.

26 Claims, No Drawings

METHOD FOR THE PRODUCTION OF AN AUTOMOTIVE EXHAUST GAS CATALYST

This invention relates to a method of producing a nickel oxide-chromium oxide-palladium oxide-alumina catalyst for use in clarifying the exhaust gases of internal combustion engines by the use of which catalyst the complete oxidation of the fuel mixture is effected. More specifically, the invention relates to a method of producing the foregoing catalyst, which when used for the treatment of the exhaust gases containing carbon monoxide (CO) or residual hydrocarbons (HC) resulting from the incomplete combustion of the fuel in the engine completely oxidizes these components to harmless carbon dioxide and water to thus effect the clarification of the exhaust gases.

The recent rapid increase in the number of automobiles on the road has given rise to a serious environmental pollution problem. This problem of air pollution is especially serious in the urban areas, and an immediate solution to the problem is desired. It is well known that a major portion of the organic pollutants in air originates from the unburned or partially burned automotive exhaust gases. It is also well known that it is a very difficult to eliminate these organic substances physically.

Thus, various methods of eliminating these organic substances are being investigated, one of which is the method of completely oxidizing the CO and HC by means of a catalyst; i.e., a method of oxidizing the CO and HC to harmless carbon dioxide and water by passing the exhaust gases through a catalyst layer. However, in order that this oxidizing catalyst can fully demonstrate its performance on being fitted to an internal combustion engine, it is required to further satisfy the following conditions from the standpoint of its practical use.

1. It must possess activity at low temperatures as well as resistance to heat.
2. It must be able to maintain its catalytic activity notwithstanding fluctuations in the rate of flow of the gas, the gas composition and the exhaust temperature.
3. It must function though the contact time is short, since there is the limitation as to space in view of the fact that the catalytic muffler must be mounted in a confined space below the floor of the automotive body.
4. Its resistance to attrition must be great, since it is to be mounted to the automotive chassis which is constantly subjected to vibrations.
5. It must possess resistance to such materials as carbon and the mist of lubricating oil, since contact occurs with these substances.
6. It must possess adequate life so as to be able to endure for a prolonged period of operation of the automobile.

The rate of flow of the exhaust gas of an engine, the compositions of the gas and the exhaust temperature fluctuate broadly. For instance, in the case of the rate of the flow of the exhaust gas, the difference between the minimum and maximum rates fluctuates up to several tens of times depending upon the operating conditions of the engine, and similarly the exhaust temperature also fluctuates from room temperature to a maximum of close to 1,000°C. Further, since a temperature rise due to the endothermic reaction inside the catalyst is added, of the foregoing conditions the resistance to heat and activity at low temperatures are of special importance.

The object of the present invention is therefore to provide an exhaust catalyst which can meet the foregoing conditions.

Research was conducted concerning various catalysts while giving consideration to the conditions indicated hereinabove, with the consequence that it was found that a catalyst obtained by molding a catalyst substance consisting of nickel oxide, chromium oxide and palladium oxide in a specified ratio and as a carrier finely divided activated alumina, along with an alumina type binder excelled in oxidizing activity as well as durability, and therefore the invention was perfected.

Thus, in accordance with the present invention a method for preparing a catalyst suitable for use in a catalytic system for the oxidation of air pollutants in automotive exhaust gases is provided, such method comprising mixing and kneading a nickel source and a chromium source in which the atomic ratio of nickel to chromium is 1:1 – 12 and the amounts thereof are such that the total amount of nickel oxide and chromium oxide contained in the catalyst to be finally obtained is 5 – 30 %, and, as a binder, either alumina sol or a soluble aluminum hydroxide in an amount, based on the weight of the catalyst to be finally obtained, of 2 – 20 %, calculated as alumina and, as a carrier, an activated alumina whose particle size distribution is in the range of 2 – 300 microns and average particle diameter is not greater than 110 microns, molding the resulting mixture into a desired shape with a catalyst molder, drying the formed material at a temperature not exceeding 150°C., followed by calcining it at a temperature not exceeding 800°C., or omission of this step, then impregnating the formed material with a palladium salt solution in an amount, based on the weight of the catalyst to be finally obtained, of 0.01 – 0.1 %, calculated as palladium, and thereafter drying the impregnated material at a temperature not exceeding 150°C. followed by calcining same at a temperature not exceeding 800°C. for 3 – 15 hours.

The activated aluminas used in the present invention are converted aluminas which have not yet reached the alpha-alumina stage and are those obtained by calcining aluminum hydroxide. They usually have a surface area exceeding 100 square meters per gram. Of these, preferred from the standpoint of heat resistant stability, activity and tackiness during the molding of the catalyst are the pseudogamma, eta and chi types of alumina. On the other hand, with respect to particle size, from the standpoint of catalytic activity and moldability those preferably used are those whose particle size distribution falls within the range of 2 – 300 microns and whose average particle diameter is not greater than 110 microns, and preferably not greater than 50 microns.

As convenient sources of nickel, mention can be made of the acetate, bromide, chloride, nitrate, oxalate, formate, carbonate, hydroxide, oxide, etc., of nickel. Since a nickel source not possessing solubility must be used as a slurry, those which are preferred are of finely divided form, e.g., those of particle diameter not greater than 110 microns.

As a convenient source of chromium, included are ammonium chromate, chromic acid, ammonium dichromate, and the nitrate, acetate, chloride, carbonate, hydroxide, oxide, etc., of chromium. Since a chromium source not possessing solubility must be used in a slurry state, best results are had by using this also in a finely divided state of not greater than 110 microns as in the case with the nickel source.

The use of palladium even in a small amount of 0.01 – 0.1 %, based on the catalyst to be finely obtained, imparts good activity in this invention. Especially in the case where the palladium has been dispersed on only the catalyst surface, good activity is demonstrated even though the amount is exceedingly small. Convenient palladium sources are the salts such as bromide, chloride and nitrate of palladium.

On the other hand, either an alumina sol or a soluble aluminum hydroxide is necessary as a binder for molding the catalyst into a molded product having great strength. As the alumina sol, conveniently useable are the commerically available acetic acid, formic acid and hydrochloric acid acidified aluminas. As the colloidal aluminum hydroxide, which is known as a soluble aluminum hydroxide sol, conveniently useable is the aluminum hydroxide having a fibrous boehmite structure which disperses colloidally when introduced into a liquid, e.g., such as Baymal, a product of Du Pont Company.

In the preparation of the invention catalyst, the use of siliceous substances must be avoided, since they impair the activity, and especially the low temperature activity, of the catalyst. Again, the use as the starting material of substances which contain as impurities the alkali metals such as sodium, potassium, etc., and alkaline earth metals such as calcium, etc., must be avoided in preparing the invention catalyst. The reason is because difficulty is experienced in removing these metals even though washing and filtration operations are repeatedly carried out and, in addition, the catalysts which contain the salts of these metals and either the elements of sulfur or phosphorus are inferior not only in their initial activity but durability as well.

As catalyst molders which are suitably used in the preparation of the invention catalyst, the extrusion molder such as shown in Canadian Patent 812,154 or a stamping type tablet machine, pill machine, etc., can be used.

According to a preferred embodiment of the invention, the intended catalyst is prepared in the following manner. A nickel source and a chromium source in which the atomic ratio of nickel to chromium is 1:2 – 6 and the amounts thereof are such that the total content of nickel oxide and chromium oxide in the catalyst to be finally obtained is 10 – 20 % and, as binder, alumina sol and/or a soluble aluminum hydroxide-containing slurry (or paste) in an amount, based on the weight of the catalyst to be finally obtained, of 2 – 20 %, calculated as alumina and, as a carrier, activated alumina whose particle size distribution is in the range of 2 – 300 microns and average particle diameter is not greater than 110 microns are thoroughly mixed and kneaded with a mixer such as, for example, a kneader to effect the thorough and intimate mutual dispersion of the nickel source and chromium source with the carrier and binder. This is followed by molding the mixture while in its wet state into a desired shape of a diameter 2 – 8 mm, and preferably 2.5 – 5 mm, calculated as spheres, using a catalyst molder such as a stamping type tablet machine, extrusion molder, pill machine, etc., followed by drying the resulting shaped objects, which, after either calcination for 3 – 15 hours at a temperature not exceeding 800°C., and preferably for 3 – 10 hours at a temperature in the range of 400° – 600°C. or without calcination, have adhered thereto a solution of a palladium salt in an amount, based on the catalyst to be finally obtained, of 0.01 – 0.1 % by weight, calculated as palladium, by means of the impregnation or spraying method. The formed material is then dried at a temperature not exceeding 150°C. and thereafter calcined for 3 – 15 hours at a temperature not exceeding 800°C., and preferably for 3 – 10 hours at a temperature in the range of 400° – 600°C.

In the case of the catalyst prepared as hereinabove described, the nickel and chromium components are uniformly dispersed in the carrier activated alumina and, since the starting materials are powders, it is porous in character. As a result, it is highly active to hydrocarbons and is effective in oxidizing and removing the paraffins, which are the most difficulty oxidizable among the hydrocarbons. Furthermore, aluminates do not form easily, and this catalyst does not easily degrade even though it is exposed to elevated temperatures. The palladium component of the catalyst possesses especially high activity to carbon monoxide and also possesses low temperature activity. Therefore, when the palladium component is deposited mainly on the surface of the formed material, it is easily warmed up when the engine is started up from its cold state.

In preparing the catalyst of the present invention, a palladium salt in an amount of 0.01 – 0.1 % by weight, calculated as palladium, may be mixed along with the activated alumina, nickel and chromium sources, and alumina sol and/or a soluble aluminum hydroxide from the outset. Since in this case the amount of palladium adhereing to the surface of the catalyst is relatively small, the resulting catalyst is somewhat inferior in its low temperature activity.

The method for preparing the catalyst is characterized in that all the starting materials are used in either a powder or liquid state. The catalyst prepared by such an invention method is more porous than that prepared by a method in which the catalytic material is adhered to a molded carrier by the impregnation method. Therefore, not only can the reaction gas molecules readily enter into the interior of the catalyst but also the residence time of the gas inside the catalyst is longer, with the consequence that the catalytic effects of the catalyst are promoted to a still greater degree. For instance, the average pore diameter of the catalyst prepared with an extrusion molder in accordance with the invention method, as determined by the mercury pressured introduction method, is 6,000 – 15,000 A and the pore distribution range is 1,000 – 30,000 A. On the other hand, the catalyst obtained by depositing similar catalyst substances an activated alumina of spherical shape has a much smaller average pore diameter value, being usually 2,000 A at most, and its pore distribution range is 200 – 2,500 A. As a result, its activity to especially hydrocarbons is poor as shown in the hereinafter given examples.

The following examples are given to illustrate the invention more fully, it being understood that these are merely intended in an illustrative sense and not in limitation of the invention.

EXAMPLE I

One hundred ninety-seven Grams of finely divided nickel nitrate and 135 grams of chromic anhydride were added to 584 grams of activated alumina of a particle size distribution in the range of 5 – 250 microns and average particle diameter of 46 microns and thoroughly mixed. This was followed by the addition of 300 grams of an alumina sol containing 10 % of alumina component, after which the mixture was thoroughly mixed and kneaded. Using an extrusion molder, this mixture was then formed into pellets 3 mm in diameter and about 6 mm in length followed by drying the resulting pellets at about 100°C. and calcination for 3 hours at about 500°C. in air. 500 Grams of these pellets were impregnated with a solution in 150 cc of water of 0.55 gram of palladium nitrate. The pellets were then dried again at about 100°C. and calcined for 3 hours at about 500°C. in air. The atomic ratio was nickel to chromium of the so obtained catalyst was 1:2 and the total weight of nickel oxide and chromium oxide was 20 % by weight, while the palladium content was 0.05 % by weight. The average pore diameter of this catalyst was 9,000 A and its pore distribution range was 2,000 – 18,000 A.

CONTROL I

This control experiment illustrates the case of a catalyst which does not contain the palladium compound. 98.5 Grams of finely divided nickel nitrate and 67.5 grams of chromic anhydride were added to 292 grams of the finely divided activated alumina of an average particle diameter of 46 microns of Example I and thoroughly mixed. This was followed by the addition of 150 grams of an alumina sol containing 10 % of the alumina component, after which the mixture was thoroughly mixed and kneaded. This mixture was then formed as in Example I into pellets having a diameter of 3 mm and a length of about 6 mm. The pellets were then dried and calcined as in Example I. The atomic ratio of nickel to chromium of the so obtained catalyst was 1:2 and the total weight of nickel oxide and chromium oxide was 20 % by weight. The average pore diameter of this catalyst was 9,000 A and the pore distribution range was 2,000 – 18,000 A.

CONTROL II

In this control experiment, instead of using a powder alumina as in the invention method, an alumina carrier previously molded into a spherical form was used.

17.1 Grams of nickel nitrate and 11.8 Grams of chromic anhydride were dissolved in 80 cc of water, after which the resulting solution was used and 120 grams of activated alumina carriers 2 – 4 mm in diameter were impregnated with this solution. After drying the impregnated carriers at 100°C., they were next impregnated with a solution containing 0.145 gram of palladium nitrate followed by drying at 100°C. and calcining for 5 hours at 500°C. The composition of the so obtained catalyst was such that the atomic ratio of nickel to chromium was 1:2, the total weight of nickel oxide and chromium oxide was 10 % by weight, and the content of palladium was 0.05 %. The average pore diameter of this catalyst was 1,800 A, and its pore distribution range was 600 – 2,500 A.

EXAMPLE II

Calcined pellets in which the atomic ratio of nickel to chromium was 1:6 and the total amount of nickel oxide and chromium oxide was 20 % by weight were prepared by the procedure described in Example I. Next, palladium in an amount of 0.05 % by weight of the pellets was deposited thereon as in Example I followed by drying and calcination of the pellets. The average pore diameter of the so obtained pellets was 12,000 A, and the pore distribution range was 3,000 – 21,000 A.

EXAMPLE III

This example illustrates the instance where the amount of palladium used is less than that of Example II.

Calcined pellets in which the atomic ratio of nickel to chromium was 1:6 and the total amount of nickel oxide and chromium oxide was 20 % by weight were prepared as in Example I. The so prepared pellets were then deposited with 0.02 % of palladium, dried and calcined, as in Example I. The average pore diameter of the so prepared catalyst was 12,000 A, and its pore distribution range was 3,000 – 21,000 A.

EXAMPLE IV

In this example the palladium was adhered to the pellets by the spraying method.

Calcined pelles in which the atomic ratio of nickel to chromium was 1:4 and the total amount of nickel oxide and chromium oxide was 10 % by weight were prepared as in Example I. A solution in 20 cc of water of 0.084 gram of palladium chloride was then spray-deposited uniformly onto 100 grams of the foregoing pellets. This was followed by again drying and calcining the pellets as in Example I. The palladium content of the so obtained catalyst was 0.05 % by weight, and its average pore diameter was 11,000 A, while the pore distribution range was 2,500 – 20,000 A.

EXAMPLE V 32.6 Grams of finely divided nickel hydroxide prepared by drying for 12 hours at 110° – 120°C. nickel hydroxide precipitated in customary manner from an aqueous nickel nitrate solution using $NH_4OH$ and 420 grams of finely divided chromium nitrate were thoroughly mixed with 494 grams of finely divided activated alumina of an average particle diameter of 46 microns such as used in Example I, after which 149 grams of fibrous, soluble boehmite, Baymal (0.714 grams of alumina contained per gram) and 450 cc of water were added and the mixture was thoroughly mixed and kneaded with a kneader. The resulting mixture was then formed into pellets 3 mm in diameter and about 6 mm in length, using an extrusion molder, followed by drying for about 3 hours at about 150°C. This was followed by impregnating 20 grams of these pellets with a solution in 80 cc of water of 0.436 gram of palladium nitrate and again drying at about 100°C., following which the pellets were calcined for 5 hours at about 500°C. in air. The composition of the so obtained catalyst was such that the atomic ratio of nickel to chromium was 1:3, the total amount of nickel oxide and chromium oxide was 15 % by weight and the content of palladium was 0.05 % by weight. The average pore diameter of this catalyst was 12,000 A and its pore distribution range was 3,000 – 21,000 A.

EXAMPLE VI 61.8 Grams of a chromium oxide gel prepared by drying for 12 hours at 110° – 120°C. chromium hydroxide preciptiated in customary manner from an aqueous chromium nitrate solution using NH$_4$OH and 58.2 grams of nickel nitrate were rendered into a slurry by dispersing or dissolving the same in 160 grams of an alumina sol containing 10 % alumina. This slurry was introduced to a powder mixture of 294 grams of activated alumina of an average particle diameter of 46 microns, such as used in Example I, and 45.4 grams of Baymal and thoroughly mixed and kneaded with a kneader. This mixture was then formed into pellets 3 mm in diameter and about 6 mm in length, using an extrusion molder, after which the pellets were dried and calcined as in Example I. Then 200 grams of these pellets were impregnated with a palladium nitrate solution as in Example I, and dried and calcined as in Example I. The atomic ratio of nickel to chromium of the so obtained catalyst was 1:3, and the total amount of nickel oxide and chromium oxide was 15 % by weight, while the palladium content was 0.05 % by weight. Further, the average pore diameter of this catalyst was 10,000 A, and its pore distribution range was 2,500 – 19,000 A.

EXAMPLE VII 18.5 Grams of nickel hydroxide prepared by drying for 12 hours at 110° – 120°C. nickel hydroxide precipitated in customary manner from an aqueous nickel nitrate solution using NH$_4$OH and 61.8 grams of a chromium oxide gel prepared as in Example VI were slurried by dispersing in 180 grams of an alumina sol containing 10 % of alumina. This slurry was then introduced to a powder mixture of 297 grams of activated alumina of an average particle diameter of 46 microns and 77 grams of Baymal and thoroughly mixed and kneaded with a kneader. The mixture was then formed into pellets 3 mm in diameter and about 6 mm in length, and dried and calcined as in Example I. This was followd by impregnating 200 grams of these pellets with a palladium nitrate solution as in Example I followed by drying and calcining as in Example I. The atomic ratio of nickel to chromium of the so obtained catalyst was 1:3, and the total amount of nickel oxide and chromium oxide contained in the catalyst was 15 % by weight, while the palladium content was 0.05 % by weight. Further, the average pore diameter of this catalyst was 10,000 A, and its pore distribution range was 2,000 – 19,000 A.

EXAMPLE VIII

In this example the palladium salt was mixed with the carrier and binder along with the nickel and chromium sources in preparing the catalyst.

72.2 Grams of finely divided nickel nitrate and 95.4 grams of chromic anhydride were thoroughly mixed with 357 grams of finely divided activated alumina of a particle size distribution range of 5 – 80 microns and an average particle diameter of 37 microns. This mixture was thoroughly mixed and kneaded in a kneader with a mixture of a solution in 20 cc of water of 1.03 grams of palladium nitrate and 190 grams of an alumina sol containing 10 % of alumina. The resulting mixture was then formed into spherical pellets of about 3.5 mm diameter, using a pill machine, followed by drying at about 100°C. and thereafter calcining for 5 hours at about 500°C. in air. The atomic ratio of nickel to chromium of the so obtained catalyst was 1:4, and the total amount of nickel oxide and chromium oxide contained was 20 % by weight, while the palladium content was 0.1 % by weight. Further, the average pore diameter of this catalyst was 11,000 A, and its pore distribution range was 2,000 – 19,000 A.

EXAMPLE IX

The activity of the catalysts obtained in the foregoing Examples I – VII and Controls I – II was tested in the following manner.

Five cc of each catalyst were packed in a stainless steel reaction tube having an inside diameter of 18 mm, and a gas mixture composed of one volume % of CO, 600 ppm of $C_3H_8$, 5 volume of $O_2$ and the rest $N_2$ was passed through the tube at a space velocity of 30,000 hr$^{-1}$ (150 Nl/hr) at a temperature of 200° – 500°C. When the effluent gas was analyzed by means of gas chromatography, the rate of conversion of CO to $CO_2$ (CO conversion) and the rate of conversion of $C_3H_8$ to $CO_2$ and $H_2O$ (HC conversion) at 200°, 250°, 300°, 400° and 500°C. were as follows:

| Experiment | CO Conversion (%) | | | | | HC Conversion (%) | | | | |
|---|---|---|---|---|---|---|---|---|---|---|
|  | 200°C. | 250°C. | 300°C. | 400°C. | 500°C. | 200°C. | 250°C. | 300°C. | 400°C. | 500°C. |
| Example I | 47.0 | 98.0 | 99 | 100 | 100 | 0 | 33 | 65 | 92 | 100 |
| Control I | 3 | 17 | 44 | 81 | 98 | 9 | 20 | 53 | 92 | 100 |
| Control II | 18 | 87 | 96 | 99 | 100 | 0 | 28 | 38 | 75 | 88 |
| Example II | 43 | 98 | 99 | 100 | 100 | 3 | 37 | 69 | 91 | 100 |
| Example III | 2 | 67 | 96 | 99 | 100 | 3 | 29 | 64 | 95 | 100 |
| Example IV | 85 | 99 | 100 | 100 | 100 | 5 | 33 | 57 | 88 | 100 |
| Example V | 48 | 88 | 98 | 100 | 100 | 7 | 35 | 58 | 87 | 100 |
| Example VI | 57 | 86 | 98 | 100 | 100 | 2 | 35 | 60 | 88 | 100 |
| Example VII | 38 | 92 | 98 | 99 | 100 | 2 | 47 | 79 | 92 | 100 |
| Example IX | 18 | 98 | 99 | 100 | 100 | 8 | 31 | 62 | 87 | 100 |

Although good results are demonstrated in both the CO and HC conversion in the case of the invention catalyst, the activity to CO in the case of the catalyst of Control I is not satisfactory while the activity to HC is not good in the case of the catalyst of Control II.

EXAMPLE X

As representative of the invention catalyst 50 cc of that obtained in Example I were packed in a stainless steel reaction tube having an inside diameter of 30 mm, and the inlet temperature was set at 400°C. by means of an electric furnace.

Bench test equipment on which was mounted a commerically available 6-cylinder gasoline engine of 2,000 cc displacement was used, and the engine was operated at an engine revolution of 2,000 rpm and a boost pressure of 380 mm Hg, using lead-free gasoline. A part of the exhaust gas from this engine and the required amount of air were mixed with a blower and passed over the foregoing catalyst at the rate of 25 liters per minute calculated at room temperature for 100 hours. When the CO and total HC (calculated as propane) were analyzed by gas chromatography, the composition of the gas at the inlet was 1.5 – 2.0 % CO, 5.5 – 6.4 % $O_2$, 130 – 220 ppm HC and the balance $CO_2$, $H_2O$, $N_2$, etc., whereas the emmission gas contained only 0.01 – 0.06 % CO and 5 – 18 ppm HC, thus showing a marked decrease of these gases. The temperature of the catalytic layer was 490° – 564°C. during this test. When the conversions were calculated, it was 97 – 99.6 % for CO and 90 – 97 % for HC. Further, no decrease in activity was seen with the passage of time.

EXAMPLE XI

A conversion having a catalytic layer whose dimensions both lengthwise and breadthwise were 160 mm and whose depth was 40 mm was packed with the catalyst prepared as in Example I. The converter was then mounted at a point 1.5 meters from the outlet of the engine manifold. The exhaust gas was then passed through for 100 hours under the conditions of 4 mode test procedure prescribed by the Ministry of Transportation of Japan, using lead-free gasoline. The 4 mode test procedure is carried out in the following manner. Idling, 0 – 40 km per hour acceleration 40 km per hour road load cruise and 40 – 0 km per hour deceleration operations are repeated, the acceleration from 0 to 40 km per hour being carried out in 11.5 seconds at this time and the deceleration from 40 to 0 km per hour being carried out in 7 seconds. The measurement value of the concentration of the exhaust gas obtained during the idling is multiplied by a weighting factor of 0.11, the measurement value obtained during the acceleration is multiplied by a weighting factor of 0.35, the measurement value obtained during the cruise is multiplied by a weighting factor of 0.52, and the measurement value obtained during the deceleration is multiplied by a weighting factor of 0.02. These values are totaled and this is designated the average exhaust concentration. The engine used in the test was that of Example X. When the gas entering the converter and that emitted therefrom were analyzed with a nondispersive infrared gas analyzer, the results were as follows: Whereas the entering CO averaged 3.0 – 3.5 % and the entering HC was 200 – 300 ppm, the CO emitting from the exit averaged initially 0.03 % and after the 100-hour test, 0.12 %. On the other hand, the HC emitting from the exit was initially 3 ppm and after the 100-hour test, 5 ppm. The conversions were initially CO 98.5 % and HC 98.2 % and, after the 100-hour test, CO 96.2 % and HC 97.9 %. The temperature at the entrance to the converter was between 220° and 240°C. during the test, and the temperature of the catalytic layer was from 625° to 665°C.

EXAMPLE XII

A downflow type converter having a catalytic layer 300 mm in length, 200 mm in width and 35 mm in depth (inside volume 2 liters) was packed with the catalyst prepared as in Example I. The converter was then mounted to a commerically available 4-cylinder engine of 1,600 cc displacement at a point 800 mm from the outlet of the engine manifold, the secondary air required being mixed and introduced at the inlet of the converter by an air pump. The 7 mode 7 cycle test procedure as prescribed in the U. S. Government Federal Register, vol. 33, No. 108 (1968) was then conducted using lead-free gasoline. The engine was mounted on bench test equipment and as the transmission a three-speed automatic torque converter was used. For absorbing the power, a 110 KW edic-type electrodynamometer, an inertia flywheel of 0.7 kg-m-sec$^2$ and disk brakes were directly coupled. The program control apparatus was then operated. The analysis of the emission gas was carried out using the MEXA-18 type analyzer manufactured by Horiba Seisakujo, Japan [analyses of CO, $CO_2$, NO and $NO_2$ was by means of the nondispersive infrared gas analyzer (NDIR), and the analysis of HC was by mean of the flame ionization analyzer (FID)].

When hot, the concentration at the inlet of the converter of CO was 19 – 25 g/mile and that of HC was 2.1 – 2.6 g/mile, whereas at the outlet of the converter the concentration of CO was initially 1.5 g/mile and that of HC was initially 0.52 g/mile and, after a 20,000 km run that of CO was 1.8 g/mile and that of HC was 0.63 g/mile. As to the operational pattern of the durability drive mode of the test, this was carried out in the following manner. Road load runs at 60 km per hour and 80 km per hour were alternately run for two minutes, and at the time of the change in speed the deceleration to 30 km per hour was practiced without fail, following which the acceleration to the next prescribed speed was immediately carried out at full throttle.

During the test the inlet temperature of the converter, when hot, was 300° – 400°C. and the temperature inside the catalytic layer ranged between 440° and 550°C.

We claim:

1. A method for preparing a catalyst suitable for use in a catalytic system for oxidation of air pollutants in automotive exhaust gases, said method comprising, in combination, the steps of mixing and kneading a nickel compound selected from the group consisting of a water-soluble nickel salt, nickel hydroxide and nickel oxide and a chromium compound selected from the group consisting of a water-soluble chromium salt, chromium acid, chromium hydroxide and chromium oxide, the atomic ratio of nickel to chromium being 1 : 1–12, and the amounts of said nickel compound and chromium compound being such that the total weight of nickel oxide and chromium oxide contained in the final catalyst is 5 – 30%, and, as a binder, a member selected from the group consisting of an alumina sol and a soluble aluminum hydroxide, said binder being used in an amount of 2 – 20%, calculated as alumina, based on the weight of the final catalyst and, as a carrier, activated alumina having a particle size distribution in the range of 2 – 300 microns and an average particle diameter of not greater than 110 microns; molding the resulting mixture with a catalyst molder into a desired shape; drying the molded material at a temperature not exceeding 150°C; impregnating the dried molded material with a solution of a water-soluble palladium salt in an amount of 0.01 – 0.1%, calculated as palladium, based on the weight of the final catalyst; drying the impregnated material at a temperature not exceeding 150°C.; and thereafter calcining the dried material at a temperature not exceeding 800°C. for 3 – 15 hours to prepare the final catalyst.

2. The method of claim 1 wherein said nickel compound is a solution of a soluble nickel salt.

3. The method of claim 1 wherein said nickel compound is a slurry of a finely divided, difficulty soluble nickel compound of an average particle diameter not greater than 110 microns.

4. The method of claim 1 wherein said chromium compound is a solution of a soluble chromium salt.

5. The method of claim 1 wherein said chromium compound is a slurry of a finely divided, difficulty soluble chromium compound of an average particle diameter no greater than 110 microns.

6. The method of claim 1 wherein said nickel salt is selected from the group consisting of the acetate, bromide, chloride, nitrate, oxalate, formate and carbonate of nickel.

7. The method of claim 1 wherein said chromium salt is selected from the group consisting of ammonium chromate, ammonium dichromate, chromium nitrate, chromium acetate, chromium chloride, and chromium carbonate.

8. The method of claim 1 wherein the palladium salt is selected from the group consisting of the bromide, chloride and nitrate of palladium.

9. A method for preparing a catalyst suitable for use in a catalytic system for oxidation of air pollutants in automotive exhaust gases, said method comprising, in combination, the steps of mixing and kneading a nickel compound selected from the group consisting of a water-soluble nickel salt, nickel hydroxide and nickel oxide and a chromium compound selected from the group consisting of a water-soluble chromium salt, chromic acid, chromium hydroxide and chromium oxide, the atomic ratio of nickel to chromium being 1 : 1 – 12, and the amounts of said nickel compound and chromium compound being such that the total weight of nickel oxide and chromium oxide contained in the final catalyst is 5 – 30%, and, as a binder, a member selected from the group consisting of an alumina sol and a soluble aluminum hydroxide, said binder being used in an amount of 2 – 20%, calculated as alumina, based on the weight of the final catalyst, and, as a carrier, activated alumina having a particle size distribution in the range of 2 – 300 microns and an average particle diameter of not greater than 110 microns, and a water-soluble palladium salt in an amount of 0.01 – 0.1%, calculated as palladium, based on the weight of the final catalyst; molding the resulting mixture with a catalyst molder with a desired shape; drying the molded material at a temperature not exceeding 150°C.; and thereafter calcining the dried material for 3 – 15 hours at a temperature not exceeding 800°C to prepare the final catalyst.

10. The method of claim 9 wherein said nickel compound is a solution of a soluble nickel salt.

11. The method of claim 9 wherein said nickel compound is a slurry of a finely divided, difficulty soluble nickel compound of an average particle diameter not greater than 110 microns.

12. The method of claim 9 wherein said chromium compound is a solution of a soluble chromium salt.

13. The method of claim 9 wherein said chromium compound is a slurry of a finely divided, difficulty soluble chromium compound of an average particle diameter not greater than 110 microns.

14. The method of claim 9 wherein said nickel salt is selected from the group consisting of the acetate, bromide, chloride, nitrate, oxalate, formate and carbonate of nickel.

15. The method of claim 9 wherein said chromium salt is selected from the group consisting of ammonium chromate, ammonium dichromate, chromium nitrate, chromium acetate, chromium chloride, and chromium carbonate.

16. The method of claim 9 wherein said palladium salt is selected from the group consisting of the bromide, chloride and nitrate of palladium.

17. A method for preparing a catalyst of an average pore diameter of 6,000–15,000 A, which is suitable for use in a catalytic system for oxidation of air pollutants in automotive exhaust gases, said method comprising, in combination, the steps of mixing and kneading a nickel compound selected from the group consisting of a water-soluble nickel salt, nickel hydroxide and nickel oxide and a chromium compound selected from the group consisting of a water-soluble chromium salt, chromic acid, chromium hydroxide and chromium oxide, the atomic ratio of nickel to chromium being 1 : 1–12, and the amounts of said nickel compound and chromium compound being such that the total weight of nickel oxide and chromium oxide contained in the final catalyst is 5 – 30%, and, as a binder, a member selected from the group consisting of an alumina sol and a soluble aluminum hydroxide, said binder being used in an amount of 2–20%, calculated as alumina, based on the weight of the final catalyst, and, as a carrier, activated alumina having a particle size distribution in the range of 2–300 microns and an average particle diameter of not greater than 110 microns; molding the resulting mixture with a catalyst molder into a desired shape; drying the molded material at a temperature not exceeding 150°C.; impregnating the dried molded material with a solution of a water-soluble palladium salt in an amount of 0.01 – 0.1%, calculated as palladium, based on the weight of the final catalyst; drying the impregnated material at a temperature not exceeding 150°C.; and thereafter calcining the dried material at a temperature not exceeding 800°C. for 3–15 hours to prepare the final catalyst.

18. A method for preparing a catalyst of an average pore diameter of 6,000–15,000 A, which is suitable for use in a catalytic system for oxidation of air pollutants in automotive exhaust gases, said method comprising, in combination, the steps of mixing and kneading a nickel compound selected from the group consisting of a water-soluble nickel salt, nickel hydroxide and nickel oxide and a chromium compound selected from the group consisting of a water-soluble chromium salt, chromic acid, chromium hydroxide and chromium oxide, the atomic ratio of nickel to chromium being 1 : 1–12, and the amounts of said nickel compound and chromium being such that the total weight of nickel oxide and chromium oxide contained in the final catalyst is 5–30%, and, as a binder, a member selected from the group consisting of an alumina sol and a soluble aluminum hydroxide, said binder being used in an amount of 2–20%, calculated as alumina, based on the weight of the final catalyst, and, as a carrier, activated alumina having a particle size distribution in the range of 2–300 microns and an average particle diameter of not greater than 110 microns, and a water-soluble palladium salt in an amount of 0.01 – 0.1%, calculated as palladium, based on the weight of the final catalyst; molding the resulting mixture with a catalyst molder into a desired shape; drying the molded material at a temperature not exceeding 150°C.; and thereafter calcining the desired material for 3–15 hours at a temperature not exceeding 800°C. to prepare the final catalyst.

19. A catalyst of an average pore diameter of 6,000 – 15,000 A obtained by the method of claim 17, said catalyst being suitable for use in a catalytic system for oxidation of air pollutants in automotive exhaust gases.

20. A catalyst of an average pore diameter of 6,000–15,000 A obtained by the method of claim 18, said catalyst being suitable for use in a catalytic system for oxidation of air pollutants in automotive exhaust gases.

21. A method for preparing a catalyst suitable for use in catalytic system for oxidation of air pollutants in automotive exhaust gases, said method comprising, in combination, the steps of mixing and kneading a nickel compound selected from the group consisting of a water-soluble nickel salt, nickel hydroxide and nickel oxide and a chromium compound selected from the group consisting of a water-soluble chromium salt, chromic acid, chromium hydroxide and chromium oxide, the atomic ratio of nickel to chromium being 1 : 1–12, and the amounts of said nickel compound and chromium compound being such that the total weight of nickel oxide and chromium oxide contained in the final catalyst is 5 – 30%, and, as a binder, a member selected from the group consisting of an aluminum sol and a soluble aluminum hydroxide, said binder being used in an amount of 2 – 20%, calculated as alumina, based on the weight of the final catalyst and, as a carrier, activated alumina having a particle size distribution in the range of 2 – 300 microns and an average particle diameter of not greater than 110 microns; molding the resulting mixture with a catalyst molder into a desired shape; drying the molded material at a temperature not exceeding 150°C.; calcining the dried material at a temperature not exceeding 800°C.; impregnating the calcined molded material with a solution of a water-soluble palladium salt in an amount of 0.01 – 0.1%, calculated as palladium, based on the weight of the final catalyst; drying the impregnated material at a temperature not exceeding 150°C.; and thereafter calcining the dried material at a temperature not exceeding 800°C. for 3 – 15 hours to prepare the final catalyst.

22. A method for preparing a catalyst of an average pore diameter of 6,000–15,000 A, which is suitable for use in a catalytic system for oxidation of air pollutants in automotive exhaust gases, said method comprising, in combination, the steps of mixing and kneading a water-soluble nickel compound selected from the group consisting of a nickel salt, nickel hydroxide and nickel oxide and a chromium compound selected from the group consisting of a water-soluble salt, chromium acid, chromium hydroxide and chromium oxide, the atomic ratio of nickel to chromium being 1 : 1–12, and the amounts of said nickel compound and chromium compound being such that the total weight of nickel oxide and chromium oxide contained in the final catalyst is 5 – 30%, and, as a binder, a member selected from the group consisting of an alumina sol and a soluble aluminum hydroxide, said binder being used in an amount of 2–20%, calculated as alumina, based on the weight of the final catalyst, and, as a carrier, activated alumina being a particle size distribution in the range of 2–300 microns and an average particle diameter of not greater than 110 microns; molding the resulting mixture with a catalyst molder into a desired shape; drying the molded material at a temperature not exceeding 150°C.; calcining the dried material at a temperature not exceeding 800°C.; impregnating the calcined molded material with a solution of a water-soluble palladium salt in an amount of 0.01 – 0.1%, calculated as palladium based on the weight of the final catalyst, drying the impregnated material at a temperature not exceeding 150°C.; and thereafter calcining the dried material at a temperature not exceeding 800°C. for 3–15 hours to prepare the final catalyst.

23. A catalyst suitable for use in a catalytic system for oxidation of air pollutants in automotive exhaust gases prepared by the method of claim 1.

24. A catalyst suitable for use in a catalytic system for oxidation of air pollutants in automotive exhaust gases prepared by the method of claim 9.

25. A catalyst suitable for use in a catalytic system for oxidation of air pollutants in automotive exhaust gases prepared by the method of claim 21.

26. A catalyst suitable for use in a catalytic system for oxidation of air pollutants in automotive exhaust gases prepared by the method of claim 22.

* * * * *

UNITED STATES PATENT OFFICE
CERTIFICATE OF CORRECTION

Patent No. 3,787,333　　　　　　　　　Dated January 22, 1974

Inventor(s) Shoichi ICHIHARA ET AL

It is certified that error appears in the above-identified patent and that said Letters Patent are hereby corrected as shown below:

In the Heading, insert patentees' claim for priority as follows:  -- Claims priority, application Japan, November 18, 1970, No. 101038/70 --

Column 6, line 24:  cancel "pelles" and insert -- pellets --

Claim 18, line 28:  cancel "desired" and insert -- dried --

This certificate supersedes Certificate of Correction issue May 28, 1974.

Signed and sealed this 8th day of October 1974.

(SEAL)
Attest:

McCOY M. GIBSON JR.
Attesting Officer

C. MARSHALL DANN
Commissioner of Patents